United States Patent
Silberstein et al.

(10) Patent No.: US 10,459,942 B1
(45) Date of Patent: Oct. 29, 2019

(54) SAMPLING FOR PREPROCESSING BIG DATA BASED ON FEATURES OF TRANSFORMATION RESULTS

(71) Applicant: Trifacta Inc., San Francisco, CA (US)

(72) Inventors: Adam Eli Silberstein, Sunnyvale, CA (US); Edward Eli Marschner, San Francisco, CA (US); Sean Philip Kandel, San Francisco, CA (US); Philip John Vander Broek, San Francisco, CA (US); Alon Shulim Bartur, San Francisco, CA (US); Wei Zheng, San Carlos, CA (US)

(73) Assignee: TRIFACTA INC., San Francisco, CA (US)

( * ) Notice: Subject to any disclaimer, the term of this patent is extended or adjusted under 35 U.S.C. 154(b) by 366 days.

(21) Appl. No.: 15/143,167

(22) Filed: Apr. 29, 2016

Related U.S. Application Data

(60) Provisional application No. 62/156,068, filed on May 1, 2015.

(51) Int. Cl.
  *G06F 16/00* (2019.01)
  *G06F 16/25* (2019.01)
  *G06F 16/248* (2019.01)

(52) U.S. Cl.
  CPC .......... *G06F 16/254* (2019.01); *G06F 16/248* (2019.01); *G06F 16/252* (2019.01)

(58) Field of Classification Search
  CPC ......... G06F 17/30371; G06F 17/30563; G06F 17/3056; G06F 17/30554; G06F 17/30572; G06F 16/254; G06F 16/248; G06F 16/252
  USPC ........ 707/600, 602, 609, 687, 690, 691, 694
  See application file for complete search history.

(56) References Cited

U.S. PATENT DOCUMENTS

| | | | |
|---|---|---|---|
| 9,158,805 B1 | 10/2015 | Kalki et al. | |
| 2005/0192942 A1 | 9/2005 | Biedenstein et al. | |
| 2007/0112724 A1* | 5/2007 | Beach | G06F 17/30286 |
| 2012/0284223 A1* | 11/2012 | Belyy | G06F 17/30563 707/601 |
| 2015/0149437 A1* | 5/2015 | Sundarrajan | G06F 17/30442 707/714 |
| 2015/0324437 A1* | 11/2015 | Jiang | G06F 17/246 707/602 |

* cited by examiner

*Primary Examiner* — Hares Jami
(74) *Attorney, Agent, or Firm* — Fenwick & West LLP

(57) ABSTRACT

A system determines samples of datasets that are typically processed by big data analysis systems. The samples are for use for development and testing of transformations for preprocessing the datasets in preparation for analysis by big data systems. The system receives one or more transform operations input datasets for the transform operations. The system determines samples associated with the transform operations. According to a sampling strategy, the system determines samples that return at least a threshold number of records in the result set obtained by applying a transformation. According to another sampling strategy, the system receives criteria describing the result of the transform operations and determines sample sets that generate result sets satisfying the criteria as a result of applying the transform operations.

26 Claims, 13 Drawing Sheets

Fig. 7

SAMPLING FOR PREPROCESSING BIG DATA BASED ON FEATURES OF TRANSFORMATION RESULTS

CROSS-REFERENCE TO RELATED APPLICATIONS

This application claims the benefit of U.S. Provisional Patent Application No. 62/156,068 filed May 1, 2015, which is incorporated by reference in its entirety.

BACKGROUND

The disclosure relates to preprocessing of data for purposes of big data analysis in general and more specifically to sampling of data for use in development of a transforms for preprocessing big data.

Organizations generate large amount of data as a result of system activity within the organization, interactions with external systems, data generated by sensors, manual entry of data, and so on. This data is often unstructured or semi-structured and stored in a wide variety of formats. Organizations perform data mining operations on this data to extract various types of information, for example, information indicating health of various parts of the organization, for predicting performance of various projects within the organization, for determining allocation of resources within the organization and so on. Big data systems are being developed to process the huge amount of data being generated by organizations. These big data systems use parallel and distributed systems to process the data. Big data systems need the data to be available in a specific format to be able to exploit the parallelism inherent in the data.

However the quality of raw data that is generated by various systems within the organization is often not in a format that can be readily processed by big data systems. This is so because the raw data often contains missing fields, data anomalies, erroneous values, duplicate values, data that does not conform to certain type constraints, and so on. The amount of data that is in a format in which it can be processed by big data systems is typically a small fraction of the overall data available. The quality of results obtained by analyzing the data is therefore limited by the amount of data that the big data system can process. The amount of data that can be processed by the big data systems can be improved by preprocessing the raw data by transforming the data to a form that can be efficiently processed by the big data systems.

Preprocessing of data requires performing transformations to the data to bring the data to a desired form. Automatic transformation of data requires generation of scripts for performing the transformations. The development of the transformation scripts requires working with sample data since the entire dataset is typically very large. The quality of the transformation script depends on the quality of the sample dataset used to develop the transformation script. For example, if the full dataset includes anomalies that are absent in the sample dataset, the transformation script is unlikely to be able to process data having these anomalies. Conventional sampling techniques include random sampling or reading the first few rows of a dataset. These sampling techniques are very likely to provide data that does not exhibit features of the entire dataset that are necessary to test the transformation scripts. For example, if the transformation script includes a join operation and the samples of the input datasets do not include rows that can be joined based on the join criteria of the join operation, the samples are not helpful for testing the join operation. Therefore, conventional sampling techniques are inadequate and do not provide a sample set that can be used for generating a robust transformation script.

SUMMARY

A data preprocessing system receives one or more datasets and preprocesses the datasets for analysis by a data analysis system. The data analysis system requires the data of the datasets to conform to certain formatting rules. For example, a formatting rule may specify that data elements that represent a URL (uniform resource locator) must conform to a standard URL format or a data field that represents age must store numeric values. The data preprocessing system determines a set of transform operations for preprocessing the input datasets for analysis by the data analysis system. The transform operations modify records of the input datasets to increase the number of records that conform to the formatting rules. This increases the amount of data of the input datasets that can be analyzed by the data analysis system, thereby improving the quality of data analysis performed by the data analysis system. For example, if some of the URL values in the input datasets include special characters such as '?' that are not expected to occur in URLs, a transform operation may remove the '?' characters. As another example, if an address field stores entire addresses in a single column, a transform operation may split the addresses to store different fields of the addresses in different columns, for example, the street name in one column, the city in a second column, the zip code in a third column, and so on.

The data preprocessing system determines the set of transform operations and sample sets for developing or testing the set of transform operations as follows. The data preprocessing system applies the identified transform operation to at least a subset of the input datasets and generates a result set. The data preprocessing system configures a visualization of the result set for presentation to the user. In an embodiment, the visualization presents information describing data distribution of values of the result set. The data preprocessing system receives information identifying a subset of the result set based on the visualization. For example, the data preprocessing system may preset a chart representing a histogram of values of a column and receive a selection of a set of bars of the chart corresponding to a set of values of the column. The data preprocessing system identifies the input records that were processed by the transform operation to generate the records of the identified subset of the result set. The data preprocessing system stores the identified input records as sample sets.

According to another embodiment, a system receives a transform operation and input datasets for applying the transform operation and generates sample sets. The system applies the transform operation to subsets of input datasets to obtain a result set. The system configures a visualization of distribution of data values of the result set for presentation to the user. The system receives information identifying a subset of the result set based on the visualization. The system identifies the input records that were processed by the transform operation to generate the records of the identified subset of the result set. The system stores the identified input records as sample sets. The system comprises a computer readable non-transitory medium that stores the instructions for executing the steps of the above method.

The features and advantages described in the specification are not all inclusive and in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

FIG. 7 shows a screenshot of a user interface illustrating addition of another transform operation to the transformation script based on interactions of user with data elements, according to an embodiment.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

DETAILED DESCRIPTION

Overall System Environment

Figure 1:
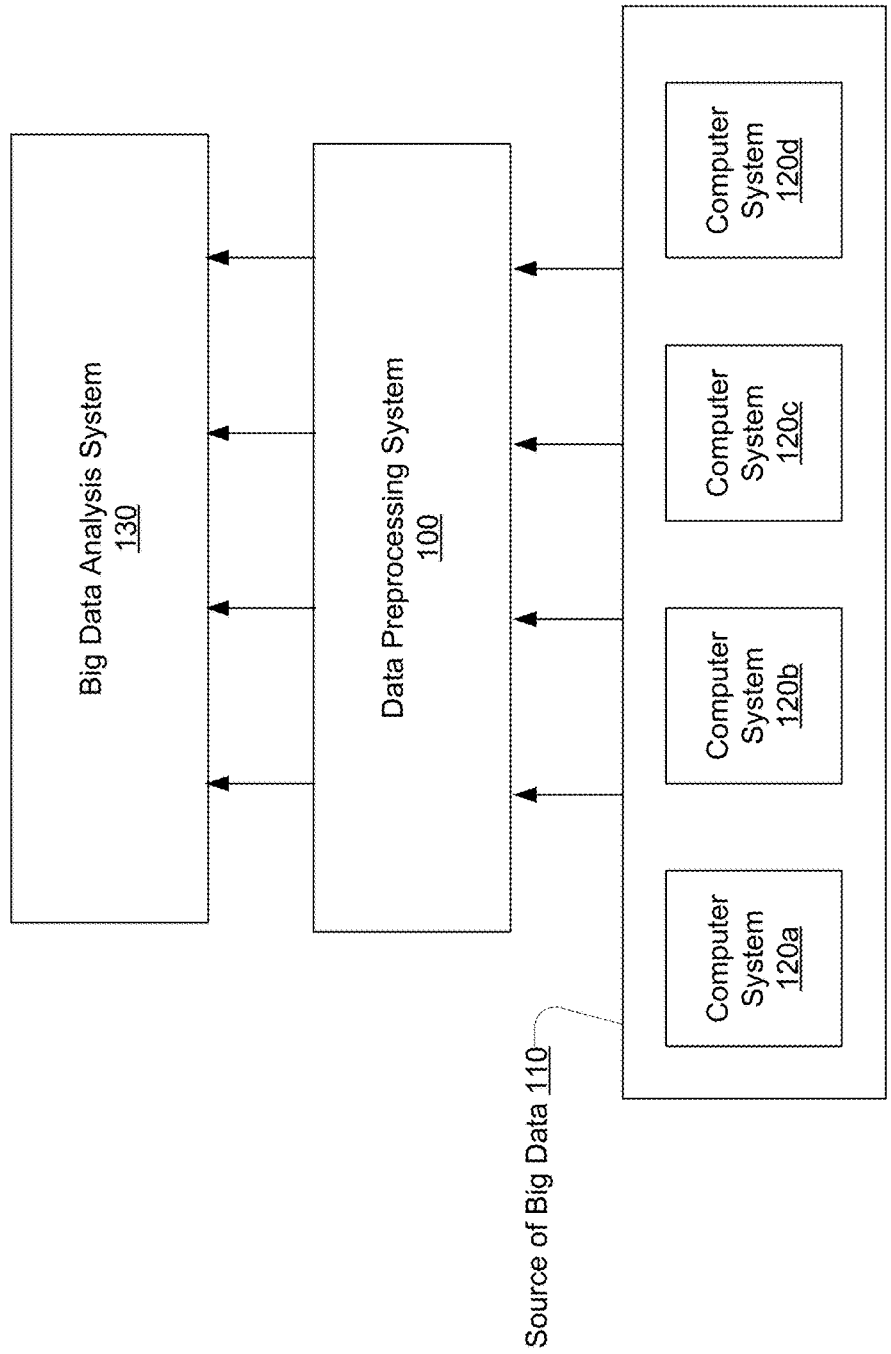
FIG. 1 shows the overall system environment for performing big data analysis, according to an embodiment.

FIG. 1 shows the overall system environment for performing big data analysis, according to an embodiment. FIG. 1 shows various systems involved in generation of and processing of big data. The overall system environment includes a source of data 110, a data preprocessing system 100, and a data analysis system 130. In other embodiments, more or less systems/components than those indicated in FIG. 1 may be used. For example, the various systems shown in FIG. 1 may interact via a network (not shown in FIG. 1). Furthermore, there may be more or less instances of each system shown in FIG. 1, for example, there may be multiple big data analysis systems 130. The big data analysis system is also referred to herein as a data analysis system, analysis system, or a system.

FIG. 1 and the other figures use like reference numerals to identify like elements. A letter after a reference numeral, such as "120a," indicates that the text refers specifically to the element having that particular reference numeral. A reference numeral in the text without a following letter, such as "120," refers to any or all of the elements in the figures bearing that reference numeral (e.g. "120" in the text refers to reference numerals "120a" and/or "120b" in the figures).

The source of big data 110 may be an organization or enterprise that uses multiple computer systems 120 for processing data of the organization or enterprise. Each computer system 120 performs activities that result in generation of data. For example, a computer system 120 may perform transactions and generate logs based on the transactions. Another computer system (or systems) may process and generate data based social interactions by logging actions performed by users. Another computer system 120 may process, generate, and store images. The data available in the computer systems 120 is analyzed by a big data analysis system 130.

Since the amount of data generated by such sources of data can be large and unstructured, conventional analysis tools, for example, reporting systems based on database queries are often not capable of processing this data. As a result, big data analysis systems 130 are used that are often parallel and distributed systems that are capable of processing structured and unstructured data. Big data analysis systems 130 typically analyze big data to perform data mining operations, predictive analysis, forecasting, text mining, and so on. For example, large amount of data representing sales, interactions between users, and so on may be used for derive sales trends among different types of consumers, to predict success of different sales campaigns, and so on.

The raw data produced by source of big data 110 includes several records that are not in a form in which the big data analysis system 130 can process. The big data analysis system typically requires the input data to conform to certain formatting rules. The formatting rules may be specific to certain columns of a dataset or may apply to multiple columns. A formatting rule may specify various constrains applicable to a particular type of data.

Following is an example illustrating non-conformance of raw data with respect the formatting rules of a big data analysis system 130. The big data analysis system 130 may expect a particular field to be numeric whereas various data records obtained from the source of big data 110 may include alphabetic characters or even special characters. Similarly, the big data analysis system 130 may expect a field to store URLs (uniform resource locators) and not all values of the field produced by the source of big data 110 may include URLs in a proper format. As another example, the big data analysis system 130 may assume one or more different formats of addresses for an address field. However, the source of big data 110 may produce addresses in formats that were not anticipated by the big data analysis system 130.

The data preprocessing system 100 performs processing of the raw data obtained from the sources of big data 110 to transform the raw data into a format that is suitable for consumption by the big data analysis system 130 (i.e., a format that conforms to the formatting rules of the big data analysis system 130.) For example, if the raw data includes URLs that do not conform to the standard URL format, the data preprocessing system 100 transforms the data to generate URL in a format that can be processed by the big data analysis systems 130. As an example, assume that several URL fields include values of the form "http;//xyz.com" where the prefix "http" is followed by ";" instead of ":". This may happen, for example, if the URLs are obtained from logs based on URL values manually entered by users (that include commonly occurring typos.)

In an embodiment, the step of preprocessing performs cleansing of the data by removing data that does not satisfy criteria that determine whether the data can be processed by the big data analysis system 130. These criteria include various constraints that may be specified for the data, for example, properties of different types of data including format of the data, types of values that can be occupied by specific fields, and so on.

End users often make mistakes while entering URLs, thereby introducing incorrect URL values in the data. However, the data entered by the user is still valuable information since the system may be able to derive information based on the fact that the user intended to enter a specific URL. The intended URL may be obtained by performing a simple transformation of the incorrect URL field that replaces ";" by ":". The data preprocessing system 100 may include a large number of such transform operations that preprocess the raw data produced by sources of big data 110.

The transform operations may be provided by experts that review the data produced by the big data source 110. The data preprocessing system 100 includes transform operations that correct commonly occurring patterns of bad data typically generated by sources of big data 110. Accordingly, the data preprocessing system 100 takes raw data generated by sources of big data 110 and prepares (or preprocesses) the data so as to transform the raw data for consumption by big data analysis system 130.

The data preprocessing system 100 may not be able to transform all available raw data to a format that conforms to the formatting rules of the big data analysis system. For example, certain fields may store values from which no meaningful information may be deciphered. However, even if the data preprocessing system 100 is able to preprocess a significant portion of raw data, the amount of information available to the big data analysis system 130 increases by certain amount.

As an example, assume that the big data analysis system is able to process 50% of the raw data generated by the source of big data without any preprocessing. The remaining 50% of the raw data is assumed to be bad raw data that does not conform to the formatting rules of the big data analysis system 100. Assume that the data preprocessing system 100 is able to transform 80% of the bad raw data to a form that can be processed by the big data analysis system 130 but is unable to decipher the remaining 20% of the bad raw data. In this situation, even though the data preprocessing system 100 is unable to decipher 20% of the bad raw data, the data preprocessing system 100 helped increase the amount of data that can be processed by the big data analysis system 130 to 80% of the original raw data. As a result, the big data analysis system 130 is likely to be able to generate more accurate information or derive new information based on the additional data that the big data analysis system 130 is able to process.

Detailed System Environment

Figure 2:
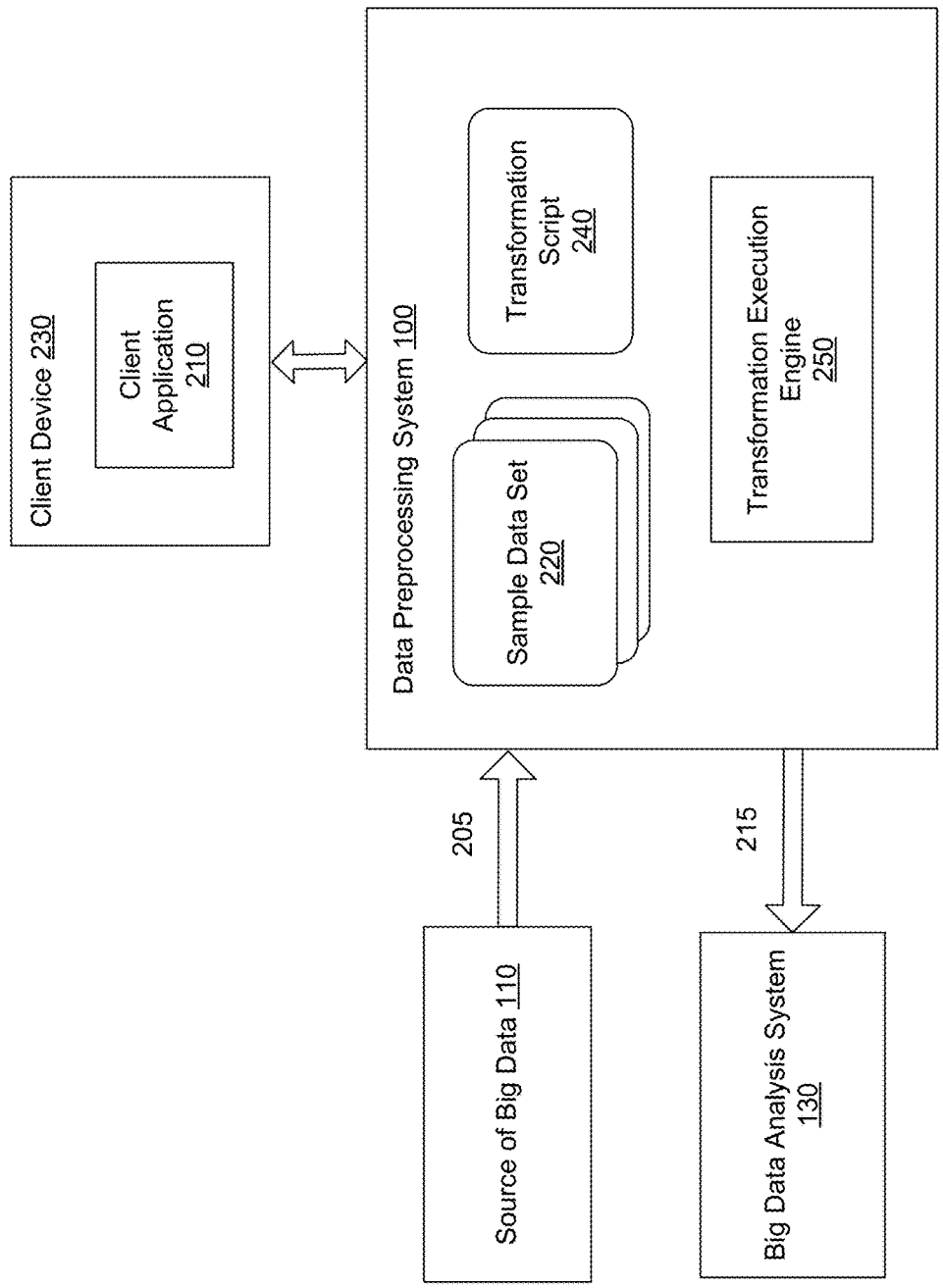
FIG. 2 shows the overall system environment illustrating details of data preprocessing system for preprocessing data for big data analysis, according to an embodiment.

FIG. 2 shows the overall system environment illustrating details of data preprocessing system for preprocessing data for big data analysis, according to an embodiment. Similar to FIG. 1, the data preprocessing system 100 receives 205 data from sources of big data 110, preprocesses the data to improve the amount of data that can be analyzed by the big data analysis system 130 and provides 215 the preprocessed data to the big data analysis system 130.

A user may interact with the data preprocessing system 100 via the client device 230. The client device 230 executes a client application 110 that allows a user to interact with the data preprocessing system 100, for example, to develop and/or test transformation scripts that are used for preprocessing of the data. A transformation script includes a set of transform operations (or a sequence of transform operations.) The client application 210 may be an internet browser that interacts with the data preprocessing system 100 via internet. Alternatively, the client application 210 may be a custom application that interacts with the data preprocessing system 100 using proprietary communication protocols.

In one embodiment, a computer system executing code for the data preprocessing system 100 or the client device 230 is a conventional computer system executing, for example, a Microsoft Windows-compatible operating system (OS), Apple OS X, and/or a Linux distribution. In another embodiment, the computer system can be a device having computer functionality, such as a personal digital assistant (PDA), mobile telephone, video game system, etc.

The various systems shown in FIG. 2 may interact via a network (not shown in the figure.) The network enables communications between the various systems. In one embodiment, the network uses standard communications technologies and/or protocols. Thus, the network can include links using technologies such as Ethernet, 802.11, worldwide interoperability for microwave access (Wi-MAX), 3G, digital subscriber line (DSL), asynchronous transfer mode (ATM), InfiniBand, PCI Express Advanced Switching, etc. Similarly, the networking protocols used on the network can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above. Depending upon the embodiment, the network can also include links to other networks such as the Internet.

The data obtained from the sources 110 of big data is typically too large to be viewed in a reasonable time by a user for purposes of preprocessing the data. In an embodiment, the data preprocessing system 100 receives requests from the user to generate sample datasets 220. The data preprocessing system 100 presents user interfaces to a user via the client application 210 to receive requests from the user for developing the transformation script 240. The requests for developing the transformation script include reviewing a sample dataset, executing a transformation command on the sample dataset, and determining whether to add the transformation command to the transformation script 240. The transformation execution engine 250 executes one or more transformation commands or a transformation script against a sample dataset 210 or against the entire dataset received from a source of big data 110.

The process of developing the transformation script is an iterative process that may require several interactions between the data preprocessing system 100 and the user via the client application 210. In an embodiment, the data preprocessing system 100 uses a simple sampling strategy to get a sample dataset 230, for example, a random sampling strategy or a strategy that takes the first N rows (where N is the size of the sample.) However, these strategies are likely to present a skewed sample or a sample that is not representative of the overall dataset being processed. Accordingly, embodiments disclosed herein allow a user to interact with the data preprocessing system 100 to develop sample datasets 220 that represent features of the entire dataset being processed.

The data preprocessing system 100 interacts with the user to determine one or more sample datasets 220 that are used for development and testing of the transformation script 240. Once the transformation script 240 is finalized, the data preprocessing system 100 executes the transformation script 240 against the entire dataset received from the source of big data 110. The result of the execution of the transformation script 240 against the entire dataset is presented to the big data analysis system 130. This provides the big data analysis system 130 with data that has a much larger percentage of data that conforms to the formatting rules of the big data analysis system compared to the raw data provided by the sources of big data 110.

If the user developed the transformation script without using the various sample datasets 220 described in embodiments, the transformation script may not be fully debugged, tested or developed. Accordingly, when the user executes the transformation script on a larger dataset, the script is likely to return errors or may not even process the entire dataset. Furthermore, these errors may be obtained after executing the transformation script for a very long period of time since the size of the entire datasets can be huge. Besides, certain data may be processed incorrectly. Due to the size of the dataset being processed, it may be extremely difficult for a user to determine which data is processed correctly and which data is processed incorrectly. Embodiments of the data preprocessing system 100 allow users to use better sample datasets 210 so as to develop robust transformation scripts that are unlikely or less likely to fail or give incorrect results when executed against the entire dataset.

System Architecture of the Data Preprocessing System

Figure 3:
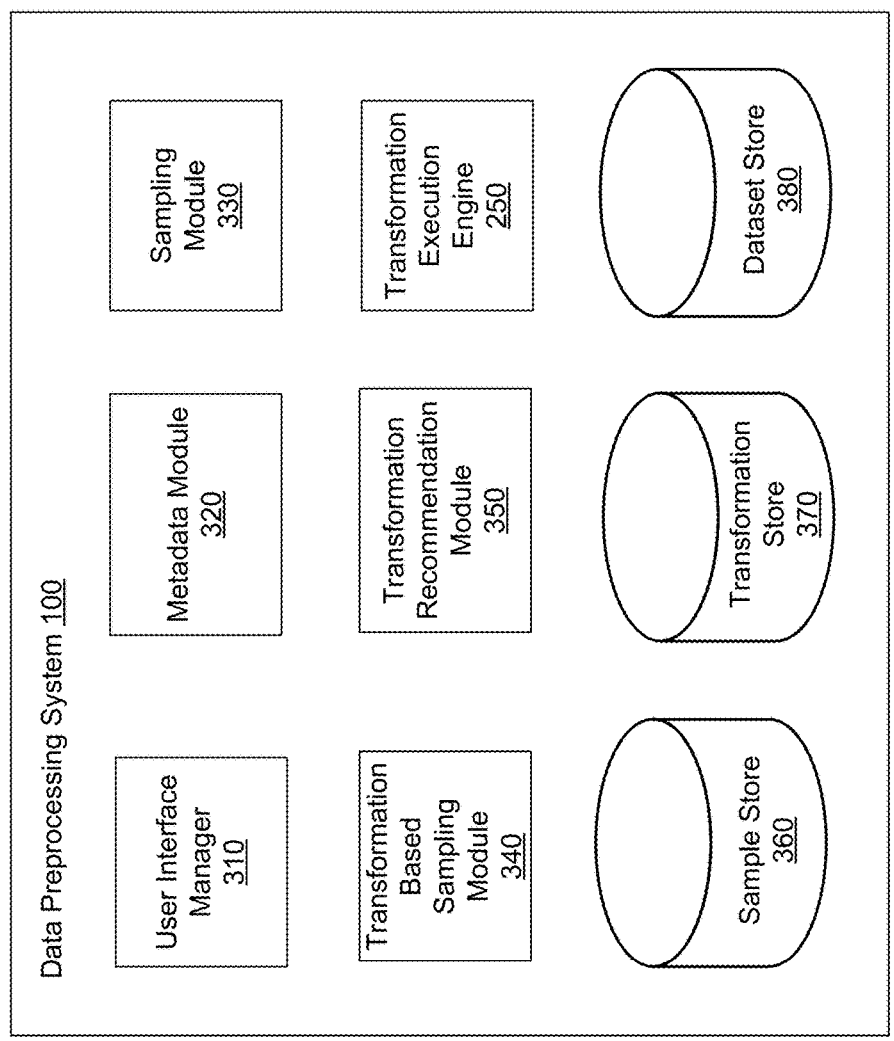
FIG. 3 shows the architecture of a data preprocessing system for preprocessing data for big data analysis, according to an embodiment.

FIG. 3 shows the architecture of a data preprocessing system for preprocessing data for big data analysis, according to an embodiment. The data preprocessing system 100 includes a user interface manager 310, a metadata module 320, a sampling module 330, a transformation based sampling module 340, a transformation recommendation module 350, a transformation execution engine 250, a sample store 360, a transformation script store 370, and a dataset store 380. In other embodiments, the data preprocessing system 100 may include other modules not described herein. Functionality indicated as provided by a particular module may be implemented by other modules instead.

The user interface manager 310 configures and presents various user interfaces to a client device 230 allowing a user to interact with the data preprocessing system 100. The user interfaces configured by the user interface manager 310 allow the user to identify datasets, specify transformations to be performed on the datasets, present information describing the datasets and so on. Various example user interfaces are described herein and presented as screenshots in FIGS. 4-9.

In an embodiment, the user interface manager 310 configures a markup language document, for example, an HTML (hypertext markup language) document corresponding to a user interface. The user interface manager 310 sends the markup language document for presentation via an internet browser (that represents a client application 210) executing on a client device 230.

The dataset store 380 stores datasets and metadata describing the datasets. In an embodiment, the data preprocessing system 100 presents a user interface to a user allowing the user to specify a source of dataset. The user interface may be presented to the user via the client application 210. The data preprocessing system 100 receives data for the dataset from the source and stores the dataset in the dataset store 380. The source of the dataset can be a file stored locally on the system executing the data preprocessing system 100, on a client device 230 used to provide the information, or on an external system. The data preprocessing system 100 receives information identifying the dataset, for example, a file address, a URL, or information identifying a data stream.

The metadata module 320 determines metadata describing the datasets received by the data preprocessing system 100. In an embodiment, the metadata module 320 takes a sample of rows and identifies row separators and column separators. By analyzing the various data values corresponding to columns, the metadata module 320 infers types of each column. In an embodiment, the metadata module 320 sends information describing the various column types to the user via the user interface manager 310. The user interface manager 310 presents the inferred metadata describing the various columns to the user via the client application 210. The client application 210 allows the user to modify the inferred column types, thereby reassigning one or more column types to a manually specified data types. The metadata module 320 receives the manually specified column types and updates the metadata stored in the dataset store 380 accordingly.

The transformation store 370 stores various types of transformations received from user via the client application 210. In an embodiment, the transformation store 370 stores transformations using a text format, for example, a syntax of a proprietary script, syntax of a standard programming language, or using markup languages such as XML (extensible markup language).

The transformation recommendation module 350 presents users with various transformations that can be used for processing data of a dataset. Examples of recommendations of transformations are shown in various figures, for example, recommendation 520 in FIG. 5, recommendations 730 in FIG. 7, and recommendations 830 in FIG. 8.

Figure 5:
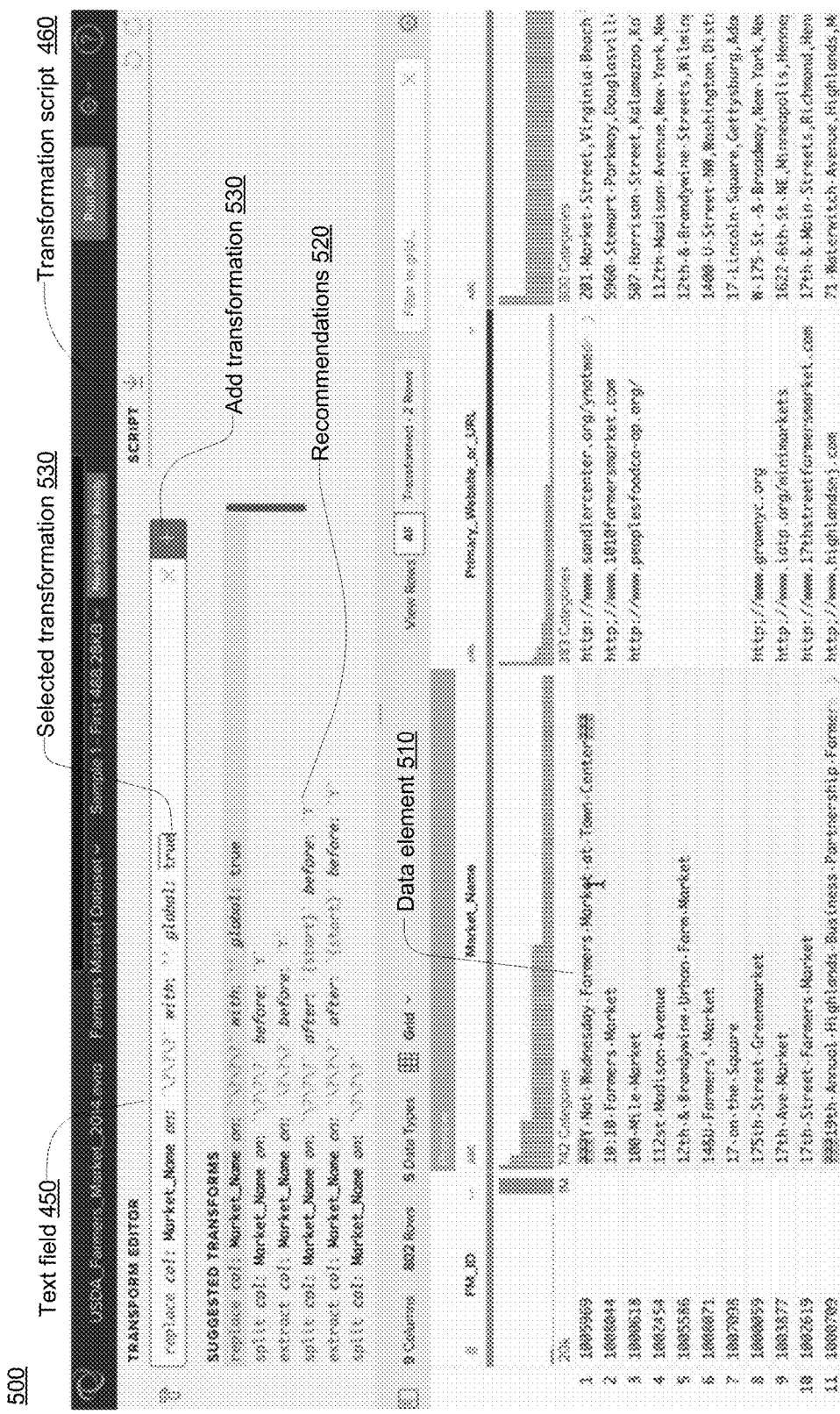
FIG. 5 shows a screenshot of a user interface illustrating addition of a transform operation to the transformation script based on interactions of user with data elements, according to an embodiment.

The transformation recommendation module 350 may generate recommendations in response to certain user actions, for example, a selection of a data element or a portion of data element by the user. For example, assume that the user interface manager 310 receives a user selection of a portion of a data value of a column specified using the client application 210. As shown in FIG. 5, a user selects the substring "???" in a data element 510. The user interface manager 310 provides information indicating the data value selected, the column of the data value, and so on. The transformation recommendation module 350 identifies various data transforms applicable to the user selection and sends them for display to the user via the user interface manager 310.

The transformation execution engine 250 executes a given transformation for a given set of input datasets. The transformations may be specified as a script. The transformation execution engine 250 includes instructions to perform various operators associated with the transformations. Examples of transformations include replacing a substring with another string, replacing a character with another character or string, replacing a substring at a particular location by another string (the location determined by identifying a character/substring and indicating whether the substring to be replaced occurs before/after the identified character/substring), splitting a column based on a separator into multiple columns, extract a substring from a data field, joining two or more datasets based on join keys, aggregating records, grouping records, determining aggregate values of a column for groups of records based on certain criteria, filtering records based on certain criteria such that only records satisfying the given criteria are output by the transform operation, and so on.

The transformation execution engine 250 stores associations between input records of input datasets that are processed by a transform operation and the output records that are generated by the transform operation based on the input records. In an embodiment, the data preprocessing system 100 identifies each record (of the input dataset or record of result sets) by using unique record identifiers. The transformation execution engine 250 associates input records with output records by storing a mapping of record identifiers from input to record identifiers of outputs (result sets) as a result of execution of a transform operation.

A transform operation such as aggregation maps multiple input records to a single output record. Accordingly, transformation execution engine 250 generates and stores a many to one mapping. The transformation execution engine 250 may store a one to one mapping of records if the transform operation maps each input record to a single output record (e.g., in a replace string operation.) The transformation execution engine 250 stores a mapping from multiple records, each record obtained from a distinct input dataset to a record of the result set if the transform operation outputs a single record based on records from different datasets, for example, a join operation. Similarly, the transformation execution engine 250 may store a one to many mapping if a single input record results in generating multiple records in the result set.

The sample store 360 stores samples of various datasets stored in the dataset store 380. The data preprocessing system 100 provides these samples for use in developing and testing transformation scripts. These transformation scripts may be used for preprocessing datasets for performing data analysis using the datasets, for example, using big data analysis systems 130. Samples stored in the sample store 360 may be determined by the sampling modules 330 or by the transformation based sampling modules 340.

The transformation based sampling module 340 determines samples associated with specific transforms or transformation scripts. Various embodiments of processes used by the transformation based sampling module 340 are described herein. The transformation based sampling module 340 invokes the sampling module 330 to use conventional sampling techniques to determine preliminary samples of datasets. The transformation based sampling module 340 performs further processing of the preliminary samples to determine transformation based samples.

An example of sampling techniques used by the sampling module 330 include random sampling that receives a size N of the sample to be determined as input and randomly selects N records from the input dataset. The sampling module 330 supports stratified sampling that preserves data distribution characteristics of the input dataset in the sample. The sampling module 330 supports cohort sampling that selects records having a common characteristic in the input data elements. For example, the sampling module 330 may select all records of the dataset that have a particular value for a column of the input dataset, or all records corresponding to activities of a user. Sampling module 330 may support congressional sampling that combines representative sampling, random sampling, stratified sampling, or other forms of sampling. Other sampling strategies that are supported by embodiments of sampling module include selecting the first N bytes to form a sample of size N or select every $k^{th}$ record of the input dataset until N records are obtained from the dataset. In other words, the sampling module 330 takes a set of rows as a sample in an order, wherein a consecutive pair of rows in the set of rows is separated by a fixed number of rows in the input dataset.

In an embodiment, the data preprocessing system receives a dataset that is distributed across a plurality of computing systems. The sampling module 330 implements a sampling strategy that selects a subset of data from each block of data assigned to a computing system. In an embodiment, the data preprocessing system 100 allows users to plug-in a custom sampling strategy, for example, by uploading a software module storing instructions for performing the custom sampling.

User Interface for Interacting with Big Data

FIGS. 4-9 show various screenshots of user interfaces configured for display to the user by the data preprocessing system 100. The data preprocessing system 100 allows users to interact with the data being analyzed for purposes of defining various transformations and generating samples of data. The user interface manager 310 renders user interfaces and sends for presentation to the user via the client application 210. The screenshots illustrated in FIGS. 4-9 are examples of user interfaces. The data preprocessing system 100 can configure the user interfaces in various other ways, for example, by using different widgets than those indicated in the user interfaces, arranging the various user interface elements in different positions with the user interface than indicated, and so on.

Figure 4:
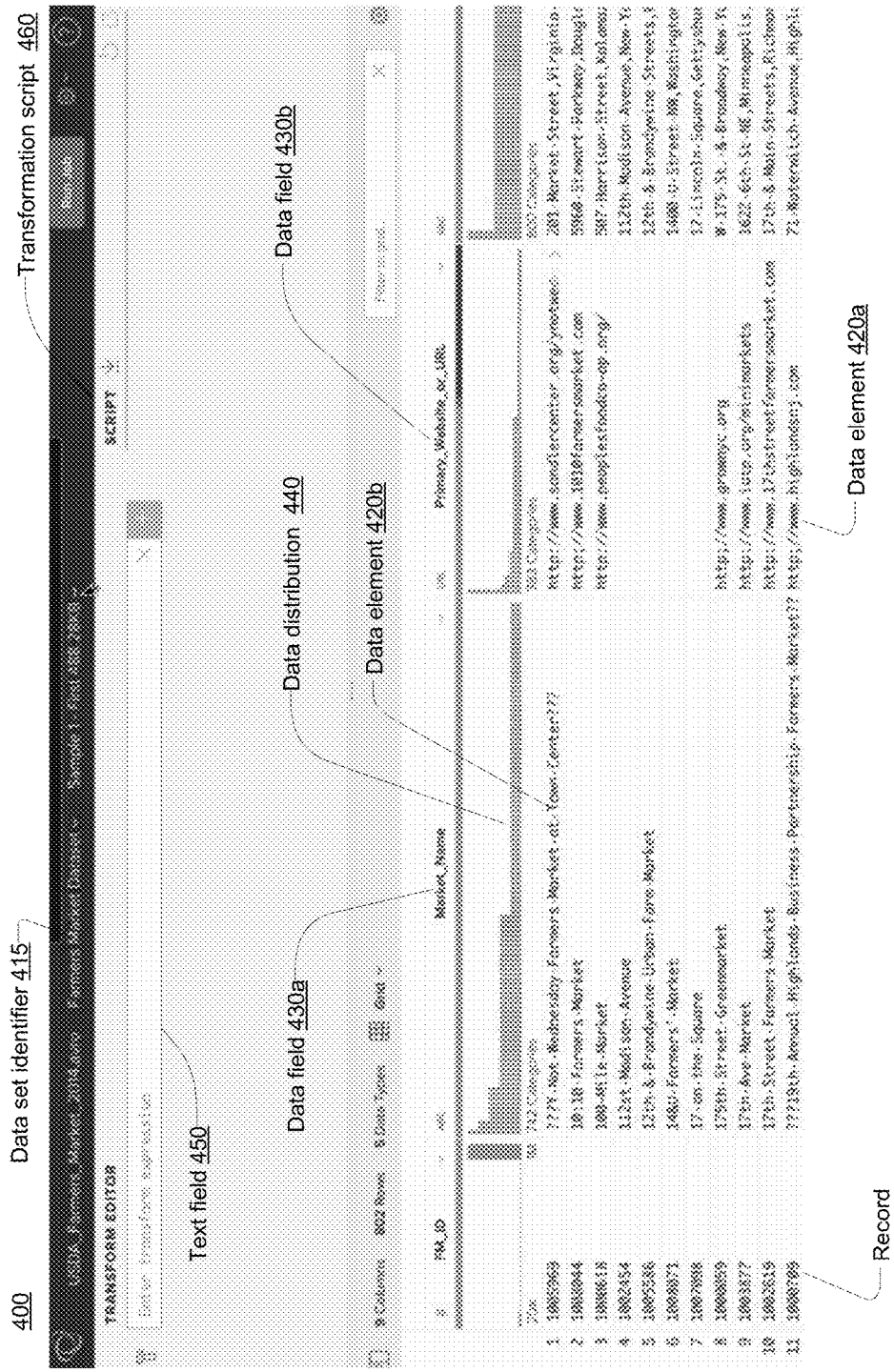
FIG. 4 shows a screenshot of a user interface showing a subset of data and statistical information describing the data, according to an embodiment.

FIG. 4 shows a screenshot of a user interface 400 showing a subset of data and statistical information describing the data, according to an embodiment. The user interface 400 shown in FIG. 4 shows information describing a dataset identified by the dataset identifier 415. A user may upload the dataset from a source of dataset that may be an external system, a file stored on a local machine or in the cloud, or any other mechanism for storing the data. The user specifies a dataset identifier 415 for each dataset that is loaded. The process of loading the dataset is not illustrated in the screenshot of FIG. 4 and occurs before the data preprocessing system 100 presents the user with the screenshot shown in FIG. 4.

The user interface 400 shown in FIG. 4 presents a subset of data of the dataset being processed. The screenshot shows only a subset of data since the entire dataset is typically too large to be displayed at once via the user interface. The dataset shown in FIG. 4 represents information describing farmers markets.

The dataset includes a set of data fields 430. Each data field stores a type of data. For example, the data field 430b stores a URL (uniform resource locator), the data field 430a stores a textual description of a farmer's market. As shown in FIG. 4, each data field 430 is represented as a column with the name of the data field 430 displayed at the top of the column.

A type of the data field is associated with certain formatting rules (or type rules) associated with the data. A data field 430 defines characteristics of the data of the data field. For example, the data field 430b represents a URL that is expected to be of the format "http:" followed by a website address. The data field 430 storing description of the farmer's markets may be associated with the data field 430 that the text representing the description may not include certain special characters, such as '?'.

The subset of data presented in the user interface 400 comprises a plurality of records. Each record comprises values for each data field of the dataset. A value may be empty. A record is identified by a record identifier 410 that represents a unique value associated with the record. As shown in FIG. 4, the data of the dataset is organized as rows and columns, with each column representing a data field and each row representing a record.

A data field 430 may store data that does not conform to the formatting rules associated with the data field. For example, data element 420a stores value "http;www.highlandsnj.com" that does not conform to the formatting rules of the data field. Specifically, the data element 420a is not of the form "http:" followed by the web page address since it stores a prefix "http;". Similarly, data element 420b does not conform to the formatting rules of the description field since it includes '?' characters.

The user interface 400 presents statistical information describing the data fields. As shown in FIG. 4, the user interface 400 shows visualization of the data distribution 440 of each field. The data distribution 440 is shown using a visual representation such as a chart. In an embodiment, the statistical information describing a data field is shown as a histogram. The histogram may be represented as a bar chart such that each bar represents a distinct data value of the data elements of the data field. Alternatively, each bar may represent a set of values of the data elements of the data field. For example, if a data field occupies a very large number of distinct values, the data preprocessing system 100 divides the data field values into buckets. Each bar of the histogram displayed represents a bucket representing a set or range of values of the data elements of that data field.

In an embodiment, the user interface 400 allows users to interact with the histogram representing the data distribution 440. For example, if a user hovers over (or selects) a particular bar of the histogram with a pointing devices such as a mouse, the user interface 400 displays information describing that particular bar including the number of elements of the dataset having the data value or data values associated with the bar and/or the data value or data values corresponding to the bar. Other interactions of the user with the bar are further described herein.

The user interface 400 shown in FIG. 4 presents the user with a text field 450 for allowing users to input transform rules. A user may specify transform operations (also referred to as transformation rules) for preprocessing the data of a dataset thereby increasing the amount of data that can be analyzed by the big data analysis system 130. For example, the transform operations may process data elements having data formatting errors as described above to eliminate the errors.

The transform operations added by the user are included in the transformation script 460. FIG. 4 shows the transformation script as empty since the user has not yet added any transform operations to the transformation script 460. However, as the user interacts with the dataset via the user interface 400, the user adds transform operations using the text field 450 that are included in the transformation script 460.

FIG. 5 shows a screenshot of a user interface 500 showing addition of an example transform operation, according to an embodiment. The data preprocessing system 100 presents suggestions of transform operations that the user can apply for a given context. In an embodiment, the user interacts with a data element of a data field. The transformation recommendation module 350 recommends a set of transform operations that may be applicable to the data element based on the user interaction. The data preprocessing system 100 receives a selection of one of the recommendations from the user. Alternatively, the data preprocessing system 100 may receive a modified recommendation based on the user selecting a recommended transform operation and modifying it. Alternatively, the user may enter a new transform operation and provide to the data preprocessing system 100.

As shown in FIG. 5, the user interacts with a data element 520a of the data field Market_Name. The user may select a portion of the data element comprising special characters (e.g., '?') that cause the data element to be non-conforming with the formatting rules for the data field. The data preprocessing system 100 determines that the user interaction with the data element 510 comprises selection of a portion of the data field. The transformation recommendation module 350 identifies a set of transformations that are applicable to the data field of the data element based on the user interaction.

The user interface 500 presents the transformation recommendations 520 determined by the transformation recommendation module 350. In an embodiment, the recommendations 520 are displayed as a drop down list from which the user can select. The user selection from the list of recommendations 520 is displayed in the text field 450. The text field 450 allows the user to edit the transformation displayed in the text field 450. Alternatively, the user may enter a new transformation from scratch without selecting any of the recommendations 520. The selected transformation as displayed within the text field 450 processes data elements of the data field Market_Name by replacing the occurrences of substring "???" with an empty string. The user interface 500 shows an add transformation button 530 that the user can select for adding the transformation of the text field 450 to the transformation script 460.

The user interface visually shows the result of applying the selected transformation to the data elements of the data field being processed. For example, the selected recommendation 530 replaces all occurrences of the substring "???" by an empty string. In other words, the transformation deletes all occurrences of the substring "???" in data elements of the selected data field. The deletion of the substring "???" in the data elements is illustrated by showing the substring "???" with a strikethrough as shown for data element 510.

Figure 6:
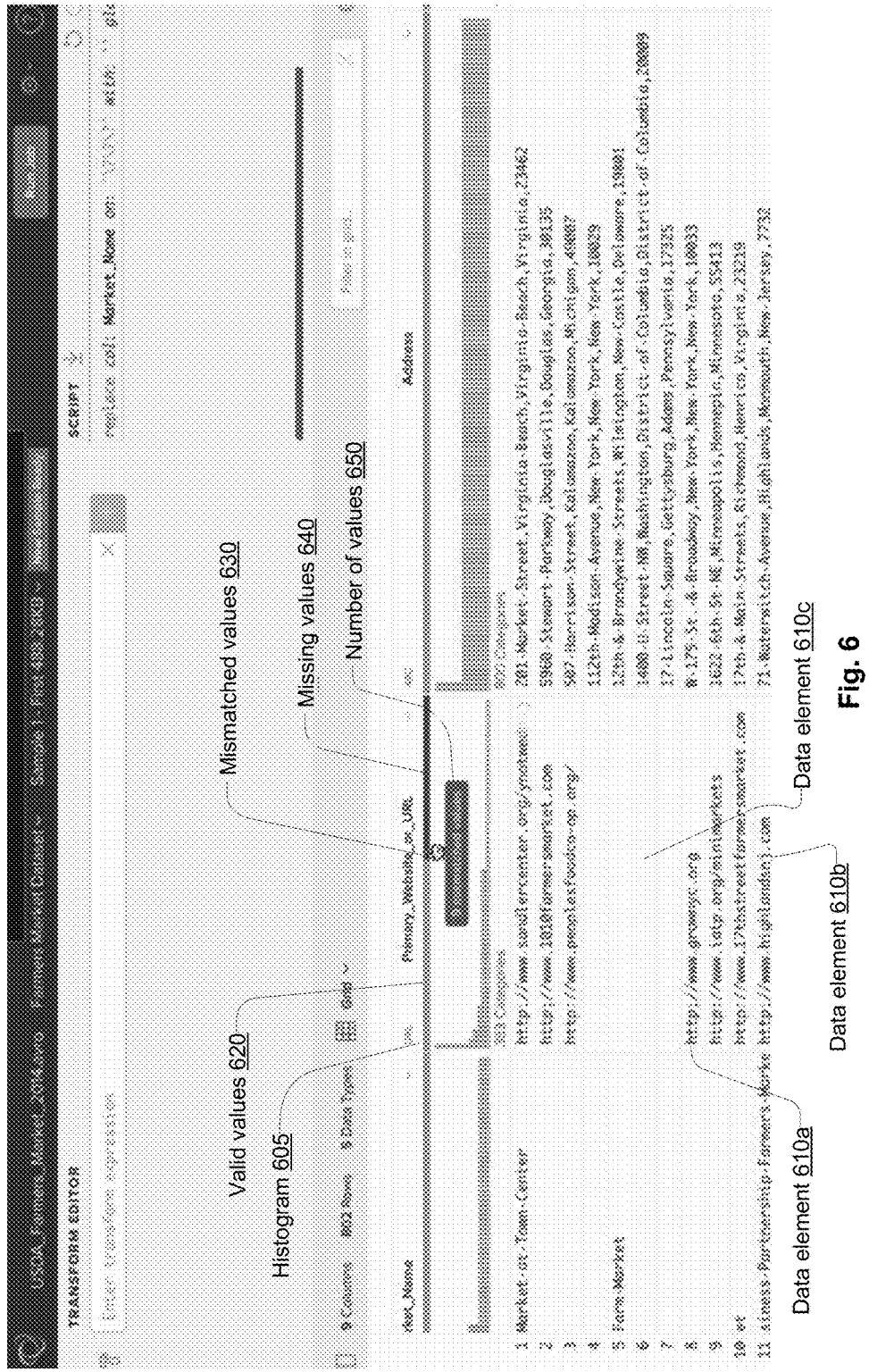
FIG. 6 shows a screenshot of a user interface showing visualization of statistical information describing a data field, according to an embodiment.

FIG. 6 shows a screenshot of a user interface 600 illustrating visualization of statistical information describing a data field, according to an embodiment. As shown in FIG. 4, the user interface shows data distribution 440 describing the number of each data value (or set of data values) of a data field. The user interface 600 illustrates the visualization of various categories of data values of a data field. More specifically, the data preprocessing system divides each data field into categories including, valid values, mismatched values, and missing values.

The valid values correspond to data values that conform to all formatting rules associated with the data field. For example, for a URL field, a data value is valid if it represents a valid URL as specified by the formatting rules. The data element 620a represents a valid value of the Primary_Website_or_URL data field. A mismatched value corresponds to a data value that does not conform to one or more formatting rules of the data field. For example, data element 610b represents a mismatched data element since the value has a prefix "http;" whereas the formatting rules requires a prefix of a URL to be of the form "http:". A missing value corresponds to data elements that do not have any data in the field. The lack of data in a field may be represented by an empty string, for example, " " or ' '. Data element 610c shows an example of a missing value.

The user interface 600 shows a histogram 605 for each data field based on the above categories of data values. Specifically, the histogram shows the number of valid values 620, the number of mismatched values 630, and the number of missing values 640. If the user provides input selecting a particular bar of the histogram 605, the data preprocessing system 100 displays additional information describing the corresponding category of values, for example, by displaying the exact number of values 650 of that category.

A user may select a subset data elements corresponding to a category of data elements of the histogram 605 by selecting the bar representing data of that category. For example, assume that the user selects the mismatched elements of the histogram 605. Accordingly, as shown in FIG. 7, the data field Primary_Website_or_URL shows only the records of the dataset having mismatched URLs in the Primary_Website_or_URL field.

Figure 7:
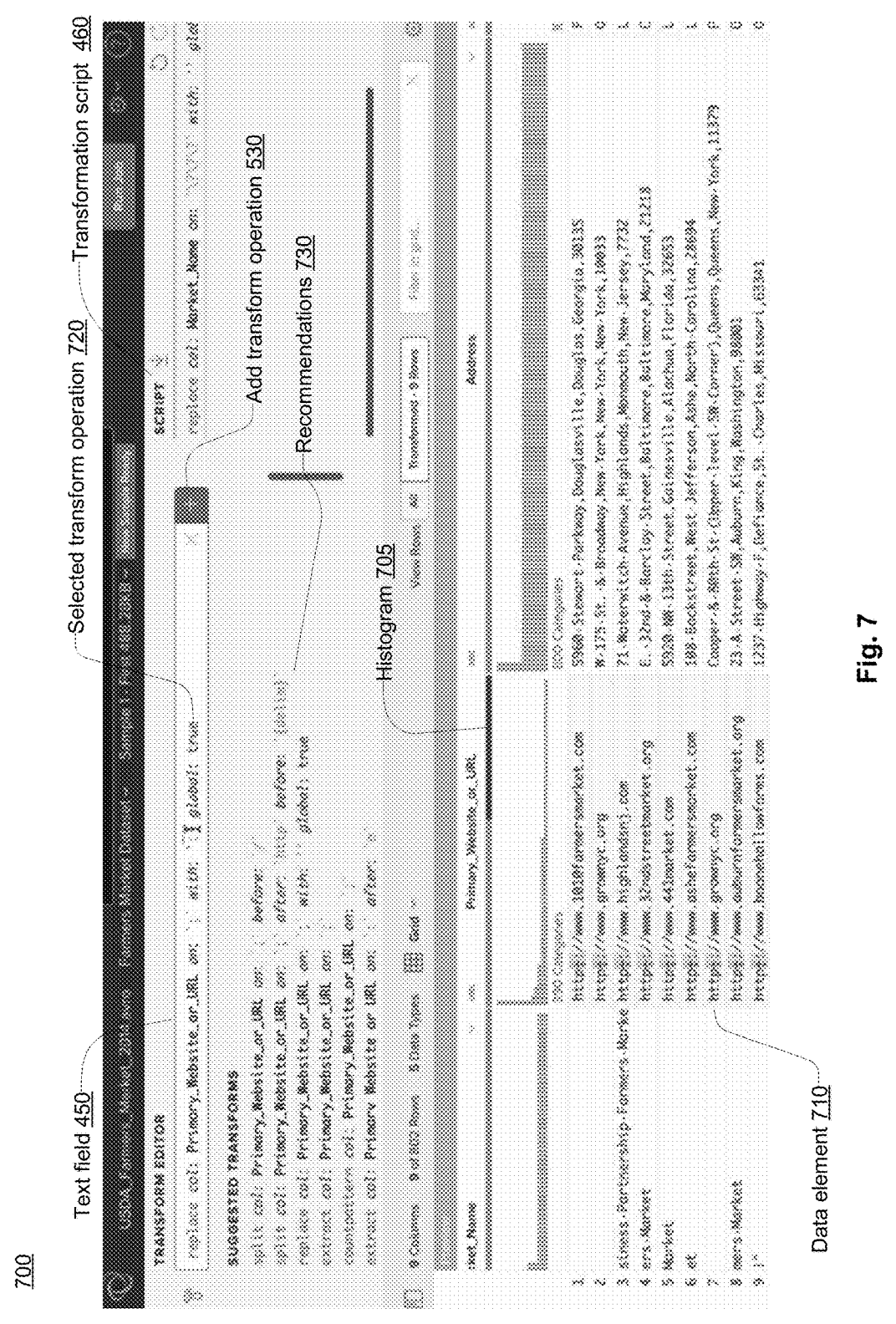

FIG. 7 shows a screenshot of a user interface 700 illustrating addition of another transform operation to the transformation script based on interactions of user with data elements, according to an embodiment. The user selects the offensive portion of a data element, for example, the ';' character of a data element 710. The transformation recommendation module 350 determines a set of transformation recommendations 730 and presents them via the user interface 700.

The user selects one of the recommendations and further edits the transformation using the text field 450. The selected transformation 720 replaces the occurrences of character ';' in the Primary_Website_or_URL data field with the character ':'. The user interface 700 displays the data elements of the data field Primary_Website_or_URL illustrating how the selected transformation would modify each displayed data field. For example, the data element 710 shows a strikethrough across the character ';' and adds the character ':' instead of the character ';'. The deleted and added characters may be distinguished from the remaining characters using different colors, different fonts, or any other visual representation.

Furthermore, the user interface 700 displays the updated histogram 705 that shows statistical information of the data field Primary_Website_or_URL after applying the selected transformation 720. Accordingly, there are no mismatched elements shown in the histogram 705. The user can add the selected and modified transformation 720 to the script 460 by using he add transformation button 530.

Figure 8:
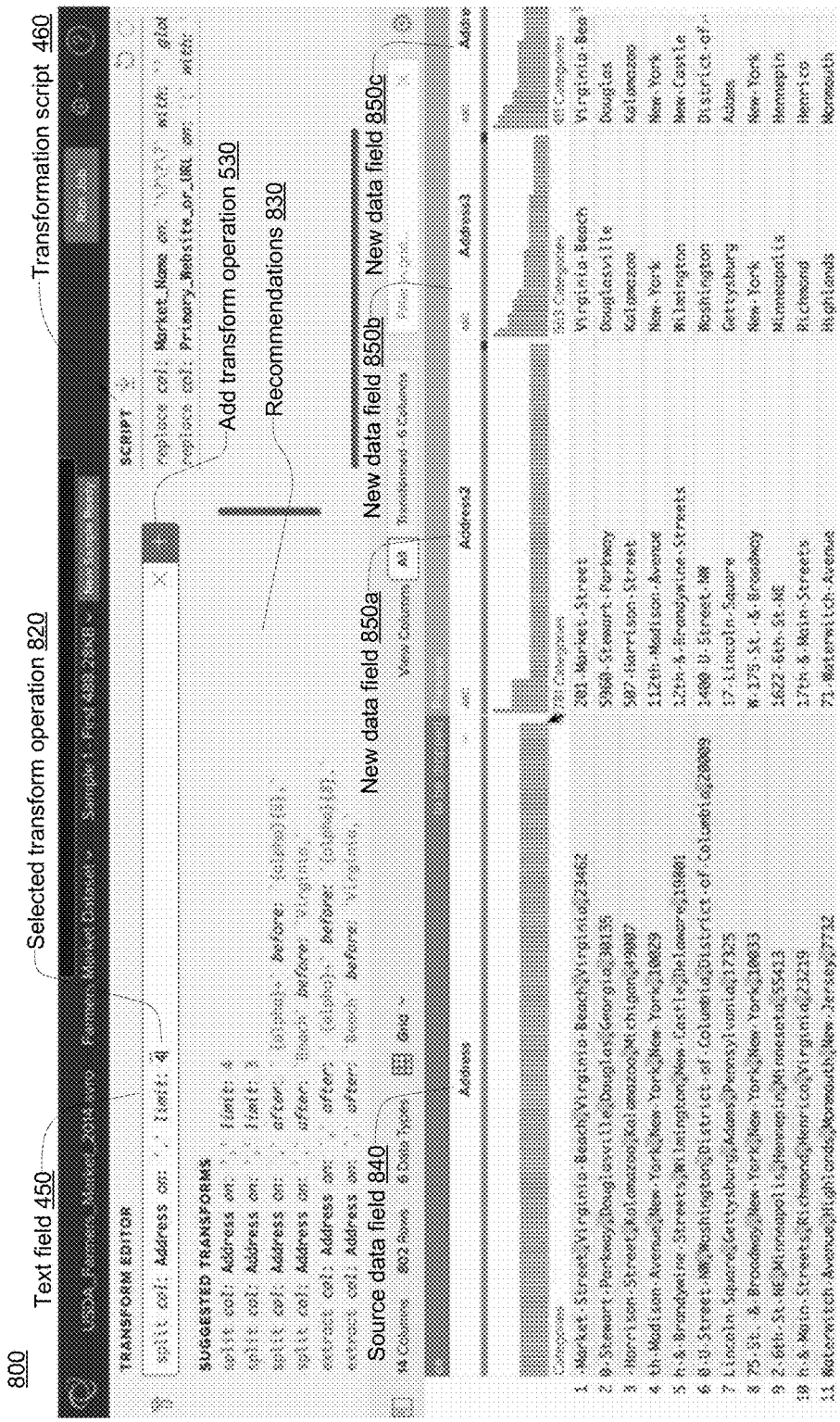
FIG. 8 shows a screenshot of a user interface illustrating a transformation that splits a data field into multiple data fields based on interactions of user with data elements, according to an embodiment.

FIG. 8 shows a screenshot of a user interface 800 illustrating a transformation that splits a data field into multiple data fields based on interactions of user with data elements, according to an embodiment. As shown in FIG. 8, the user selects a particular character of a source data field 840 (e.g., the data field "Address.") The data preprocessing system 100 receives the user interaction and determines a set of recommended transformations and presents the recommendations 830 to the user. The user selects a transformation that splits the selected data field into multiple data fields assuming the character selected by the user acts as a separator for the data values of each field.

The data preprocessing system 100 receives the user selection and adds a plurality of new data fields 850a, 850b, 850c and so on based on the selected transform operation. The data preprocessing system 100 generates names for the new data fields 850 based on the name of the data field used to generate the new data fields. The user interface 800 also presents the selected character used as a separator such that all occurrences of the selected data field are visually distinguishable from other text. For example, the selected character may be displayed using a different color, a different font, shown as blinking text, or using another other way to distinguish the character.

The data preprocessing system 100 receives a request from the user indicating via the add transformation button 530 that the user wants to add the selected transformation 820 to the transformation script 460. The data preprocessing system 100 removes adds the selected transformation 820 to the transformation script 460 and modifies the data fields of the dataset to reflect the new transform operation. Accordingly, the user interface presents the user with a dataset comprising the new data fields 850 and removes the source data field 840. The user interface allows the user to edit the names of the automatically generated data fields.

Figure 9:
FIG. 9 shows a screenshot of a user interface illustrating renaming of data fields, according to an embodiment.

FIG. 9 shows a screenshot of a user interface 900 illustrating renaming of data fields, according to an embodiment. The user interface 900 shows the new data fields 850 added in the user interface 800 of FIG. 5 after they have been renamed. The renamed data fields 950 have the same data and statistical information as the corresponding generated data fields 850 but have a different name that is user provided. The data preprocessing system 100 adds transform operations 930 to the transformation script 460.

Accordingly, as illustrated by FIGS. 5, 7, and 8 the data preprocessing system 100 receives user interactions indicating a user intent associated with modifying a data field for purposes of preprocessing the data field for providing to the big data analysis system. The data preprocessing system 100 determines transformation recommendations based on the user interactions. The data preprocessing system 100 presents the transformation recommendations to the user via the user interface. The data preprocessing system 100 receives either a selection of a recommended transformation, a modified selection of a recommended transformation, or a user provided transformation. The data preprocessing system 100 further receives a request to add the transformation to the transformation script and adds the transformation to the transformation script as requested.

The user interface 900 shows an execute button 910 that allows a user to request execution of the transformation script 460 on the entire dataset (this button is also shown in the user interfaces shown in FIGS. 4-8.) Accordingly, once the user has finalized the transformation script, the user can execute the set of transformations of the transformation script against the entire dataset being analyzed.

Overall Process

Figure 10:
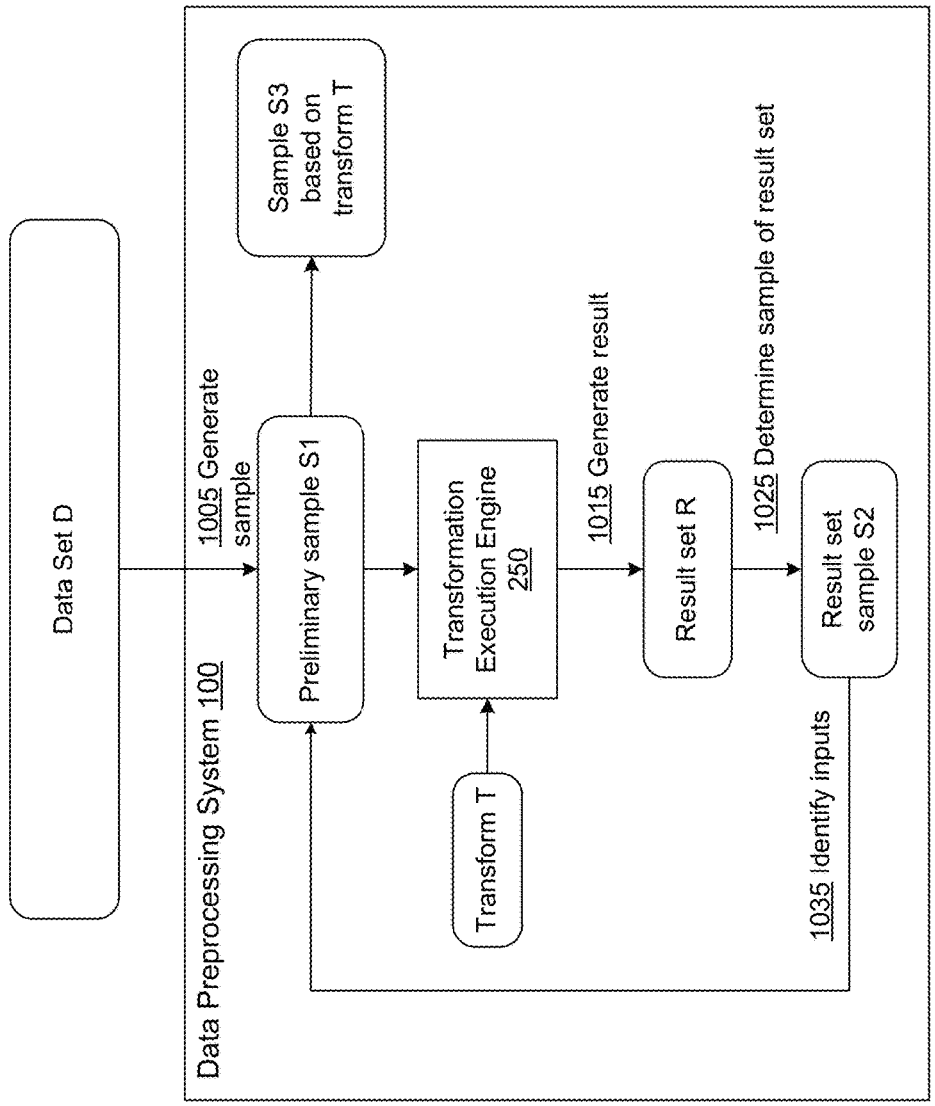
FIG. 10 illustrates the various datasets generated during the process of transformation based sampling, according to an embodiment of the invention.
Figure 11:
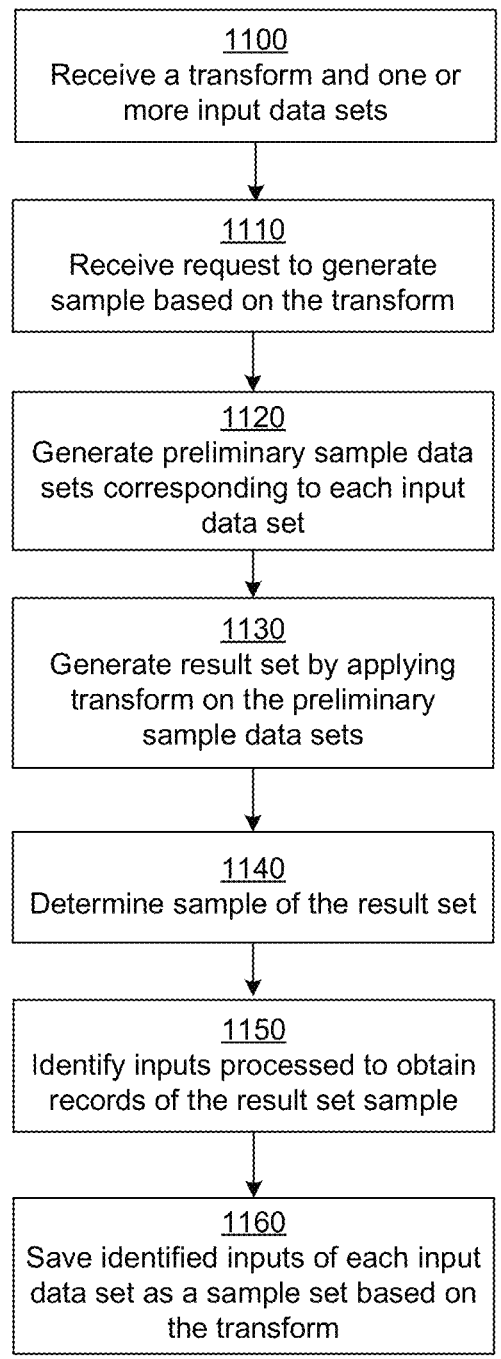
FIG. 11 illustrates a process for performing transformation based sampling, according to an embodiment of the invention.
Figure 12:
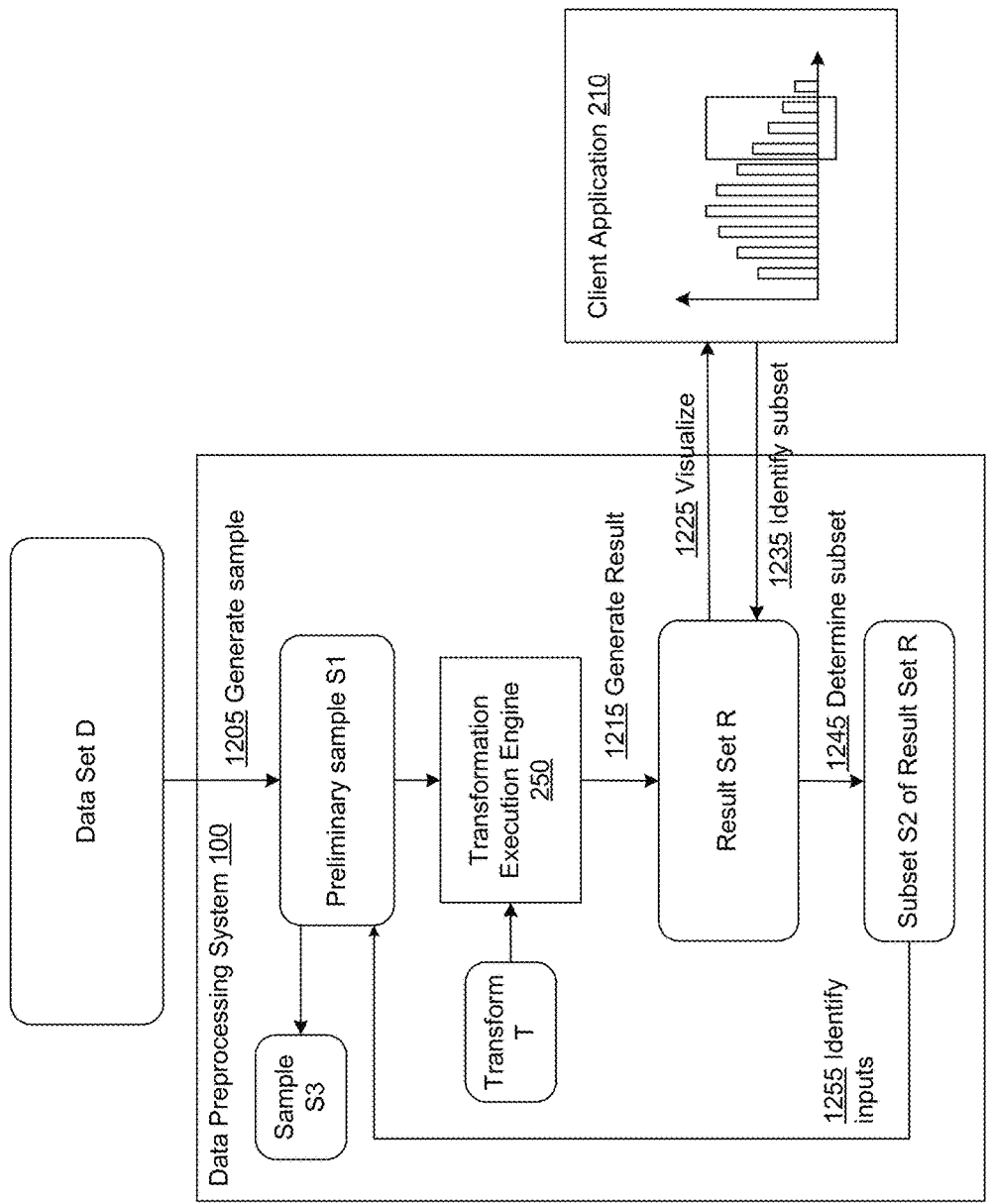
FIG. 12 illustrates various datasets generated during the process of sampling based on features of data distribution of the transformation result, according to an embodiment of the invention.
Figure 13:
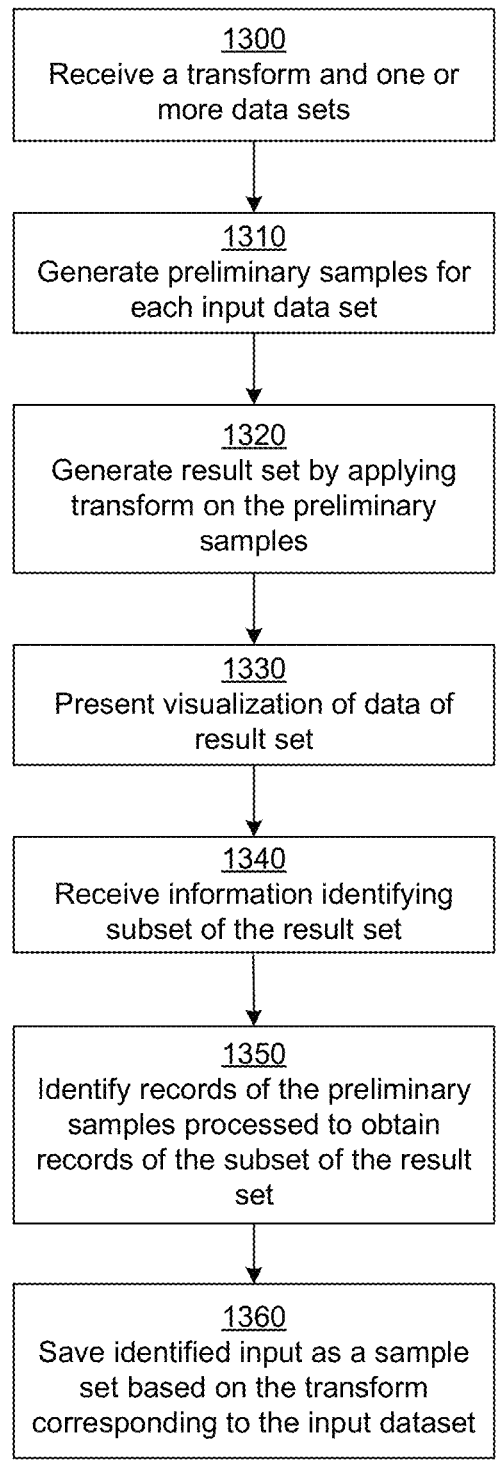
FIG. 13 illustrates a process for performing sampling based on features of the transformation result, according to an embodiment of the invention.

FIGS. 10 and 11 illustrate the datasets and processes for performing transformation based sampling, according to embodiments of the invention. FIGS. 12 and 13 illustrate the datasets and processes for performing sampling based on features of distribution of transformation results, according to embodiments of the invention. Steps shown in the flowchart illustrated in the figure may be executed in an order different from that shown in the figure. For example, certain steps may be executed concurrently with other steps. Furthermore, steps indicated as executed by certain modules may be executed by other modules.

Conventional samples do not guarantee that the sample would be useful for a specific purpose, for example, for testing and debugging a specific transform. For example, assume that user wants to include a join transform in a transformation script. The join transform joins a dataset D1 with another dataset D2 based on a join key (or a join criteria) comprising one or more columns of the datasets. The transformation execution engine 250 generates a result set by performing the join operation on the datasets D1 and D2. Each record of the result set is obtained by combining at least a first record of the first input dataset and a second record of the second input set, wherein the first record and the second record match based on the join key A random sample taken from the datasets D1 and D2 for testing and debugging may not include any records that have matching join keys. Accordingly, joining the samples of the two datasets would result in an empty result set. These samples of the two datasets do not provide the data useful for testing/debugging the transform.

Even if the two samples include few records that have matching keys, the samples may not be adequate for testing since they may not include various corner cases useful for testing/debugging the transform script using the join transform. If the transformation script is not tested adequately, the transformation script is likely to fail when applied to a large dataset. As a result errors in the transformation scripts may be detected at a very late stage in the development process, thereby wasting resources including computing resources and time and effort on the part of developers. Embodiments provide samples that are adequate for testing/debugging a given transform operation by ensuring that the samples generate records in the output of the transforms and the output result includes specific features based on distribution of the output result.

Transformation Based Sampling

FIG. 10 illustrates various datasets generated during the process of transformation based sampling, according to an embodiment of the invention. The number of datasets processed by the data preprocessing system 100 may be more or less than that shown in FIG. 10. For example, the data preprocessing system 100 may receive multiple input datasets and generate multiple transformation based samples. The data preprocessing system 100 receives information describing a dataset D. In an embodiment, the data preprocessing system 100 receives a location of the dataset, for example, an address of a local file or a URL.

The transformation based sampling module 340 generates 1005 a preliminary sample S1 from the dataset. The sampling module 330 may use a conventional sampling technique to generate 1005 the preliminary sample S1, for example, random sampling, or identifying the first N records of the data, where N is the size of the preliminary sample S1. The transformation based sampling module 340 also receives information identifying a transform T, for example, a transform that replaces substrings of a data field by a different substring, a join transform, a transform that generates certain value if a data field satisfies certain criteria, and so on. If the transformation based sampling module 340 receives a request to generate a sample for a join transform, the transformation based sampling module 340 receives a plurality of datasets being joined as input and a join criteria comprising a join key associated with the.

The transformation execution engine 250 executes the transform T on the preliminary sample set S1 to generate 1015 result set R. The transformation based sampling module 340 determines 1025 samples of the result set R to obtain a result set sample S2. In an embodiment, the transformation based sampling module 340 determines 1025 samples of the result set R if the size of the result set exceeds a certain high threshold value. If the transformation based sampling module 340 determines that the size of the result set R is within a predetermined range, the transformation based sampling module 340 determines that the entire result set R should be used as the sample S2.

However, if the transformation based sampling module 340 determines that the size of the result set R is below a low threshold value, the transformation based sampling module 340 generates 1005 another preliminary sample S1 and executes the transform T on the new sample. The data preprocessing system 100 repeats the steps of taking a new preliminary sample S1 and executing the transform on the new sample until the result set is of a size either above the high threshold or within the predetermined range.

The transformation based sampling module 340 may invoke the sampling module 330 to determine a sample of the result set, i.e., sample set S2. Alternatively, the transformation based sampling module 340 may use the entire result set R as the result set sample S2. The transformation based sampling module 340 identifies 1035 inputs of the sample set S1 that contributed to generation of each record in the result set sample S2. For example, if the transform T generates a single output record for each input record, the transformation based sampling module 340 identifies each input record of sample S1 corresponding to each output record in the result set sample S2.

If the transform T generates a single record in the result set based on a plurality of input records from preliminary sample S1, the transformation based sampling module 340 identifies all the input records processed to generate the records of the result set sample S2 (by taking a union of the plurality of input records, each plurality corresponding to an output record in the sample S2.) Similarly if each input record of preliminary sample S1 results in generation of a plurality of output records in the result set R, the transformation based sampling module 340 identifies the input records processed to obtain the records of the result set sample S2 and takes a union of the input records.

The transformation based sampling module 340 combines the input records from the preliminary sample S1 corresponding to the output records in the result set sample S2 and form the transformation based sample S3 for the transform T. In an embodiment, the transformation based sampling module builds a set of the samples S3, each sample corresponding to a transform received by the data preprocessing system. In an embodiment, the transform T may comprise multiple transformation functions. For example, the transform T may be a transformation script that executes a sequence of transform operations (or transform operations from a subset or a portion of the transformation script).

If the transform T combines records from a plurality of input datasets, for example, by joining multiple datasets, the transformation based sampling module 340 generates a transformation based sample set S3 corresponding to each input dataset. For example, assume that the data preprocessing system 100 receives two input datasets D1 and D2. The sampling module 330 generates 1005 preliminary samples S11 and S12 from the datasets D1 and D2 respectively.

The transformation execution engine 250 joins the datasets D1 and D2 as specified by the transform T to generate the result set R. The transformation based sampling module 340 invokes the sampling module 330 to determine 1015 the result set sample S2 based on the result set R. The transformation based sampling module 340 identifies the input records of the preliminary sample set S11 and the input records of the preliminary sample set S12 processed for obtaining each record of the sample set S2.

The transformation based sampling module 340 combines the input records of the sample set S11 processed for obtaining records of the sample set S2 into a sample set S31. The transformation based sampling module 340 combines the input records of the sample set S12 processed for obtaining records of the sample set S2 into a sample set S32. Accordingly, the transformation based sampling module 340 determines sample sets S31 and S32 (corresponding to input datasets D1 and D2 respectively) and adds them to sets of samples corresponding to each input dataset.

FIG. 11 shows a flowchart illustrating the process of transformation based sampling, according to an embodiment of the invention. The data preprocessing system 100 receives 1100 a transform operation and one or more input datasets on which the transform operation needs to be performed. The transformation based sampling module 340 receives 1110 a request to generate samples of the input datasets based on the identified transform.

The sampling module 330 generates 1120 a preliminary sample datasets for each of the input dataset. In an embodiment, the transformation based sampling module 340 estimates a size of the target sample based on the transform. The transformation based sampling module 340 invokes the sampling module 330 to generate 1120 the preliminary sample dataset to be larger than the estimated size of the target transformation based sample. For example, the size of the preliminary sample dataset may be a multiple of the size of the target sample based on the transform.

The transformation execution engine 250 applies the transform to the records of the preliminary sample datasets to generate 1130 a result set. The transformation based sampling module 340 invokes sampling module 330 to determine 1140 sample of the result set to obtain a sample result set. The transformation based sampling module 340 identifies 1150 the records of the preliminary sample sets processed as inputs to obtain the records of the sample result set. The transformation based sampling module 340 combines the identified inputs from each input dataset as a transformation based sample. The transformation based sampling module 340 saves the transformation based samples in the sample store 360.

Samples Based on Features of Data Distribution of Transformation Result

FIG. 12 illustrates various datasets generated during the process of sampling based on features of data distribution of the transformation result, according to an embodiment of the invention. Some of the datasets illustrated in FIG. 12 are similar to those shown in FIG. 10. The number of datasets processed by the data preprocessing system 100 may be more or less than that shown in FIG. 12. For example, the data preprocessing system 100 may receive multiple input datasets and generate multiple transformation based samples. The data preprocessing system 100 receives information describing a dataset D. In an embodiment, the data preprocessing system 100 receives a location of the dataset, for example, an address of a local file or a URL.

The sampling module 330 generates 1205 a preliminary sample S1 from the dataset D. The sampling module 330 may use a conventional sampling technique to generate 1205 the preliminary sample S1, for example, random sampling, or identifying the first N records of the data, where N is the size of the preliminary sample S1. The transformation based sampling module 340 receives information identifying a transform T, for example, a transform that replaces substrings of a data field by a different substring, a join transform, a transform that generates certain value if a data field satisfies certain criteria, and so on.

The transformation execution engine 250 executes the transform T on the preliminary sample set S1 to generate 1215 result set R. The user interface manager 310 visualizes 1125 the data of the result set R, for example, using a visual representation such as a chart. In an embodiment, the user interface manager 310 visualizes 1225 the data distribution of the result set R. The data distribution represents statistical information describing the result set R. For example, the user interface manager 310 may render bar charts displaying the data distribution of the result set R and send for presentation to the user via the client application 210. The user interface manager 310 may configure a histogram indicating distinct values of each column of the result set and send information describing the histogram for display via the client application 210.

The presentation of the data distribution of the result set R may be similar to the user interface presented in FIG. 4. Accordingly, the result set R has one or more columns. A portion of the result set R displaying data of each column of the result set R is presented via the user interface. For each column, the user interface manager 310 presents a histogram visualizing the frequency of occurrence of each distinct data value of the column. The user interface manager 310 may represent the histogram as a bar chart that shows a bar for each distinct value of the column such that the size of the bar is based on the number of occurrences of the value in column of the result set. The various bars of the histogram may be ordered in a predetermined order, for example, based on sort order of the value (increasing or decreasing) corresponding to each bar.

The user interface manager 310 receives criteria defining a subset of the result set R from the client application. The criteria defining a subset of the result set may be specified using a visual indication of a selection of a subset of records of the result set R. For example, the user interface manager 310 may receive identification of one or more values of a column, a range of values of a column, a identification of values from multiple columns, or ranges of values from multiple columns, and so on. For example, a user may select one or more bars displaying statistical information describing result set R (such as histograms of specific columns). The user interface manager 310 passes the information describing the subset of the result set R to the transformation based sampling module 340.

The transformation based sampling module 340 determines 1245 subset of the result set R based on the criteria received from the client application 210. For example, if the user interface manager 310 receives a set of values of a column, the transformation based sampling module 340 determines 1245 a subset of the result set comprising records that have that set of values for the column. The user interface manager 310 receives a first set of values for a first column and a second set of values for a second column along with an operator, say "and" or "or" operator. If the user interface manager 310 receives sets of values for two or more columns with an "and" operator, the transformation based sampling module 340 determines 1245 a subset including records for which the first column has at least a value from the first set and the second column has at least a value from the second set. Similarly, if the user interface manager 310 receives sets of values for two or more columns with an "or" operator, the transformation based sampling module 340 determines 1245 a subset including records for which either the first column has a value from the first set or the second column has at least a value from the second set.

These are examples of different ways in which the user interface manager 310 allows users to specify subsets of the result set R. The user interface manager 310 allows user to specify various criteria for selecting subsets of the result set R, for example, various logical operators, combinations of logical expressions, and so on. In an embodiment, the user interface manager 310 allows users to use a scripting language for specifying expressions that identify subsets of the result set. For example, sets of values of each column in the criteria for determining the subset are specified by listing the values in association with each column identifier.

The transformation based sampling module 340 identifies 1255 inputs of the sample set S1 that contributed to generation of each record in the subset S2 of the result set. The identification of input records that contributed to the generation of each record in the subset S2 is similar to the step of identifying 1035 inputs corresponding to the result set sample S2 shown in FIG. 10.

The transformation based sampling module 340 combines the input records from the preliminary sample S1 corresponding to the output records in the subset S2 of the result set and form the transformation based sample S3 for the transform T. In an embodiment, the transformation based sampling module builds a set of the samples S3, each sample corresponding to a transform received by the data preprocessing system. In an embodiment, the transform T may comprise multiple transformation functions. For example, the transform T may be a transformation script that executes a sequence of transformation operations.

If the transform T combines records from a plurality of input datasets, for example, by joining multiple datasets, the transformation based sampling module 340 generates a transformation based sample set S3 corresponding to each input dataset. For example, assume that the data preprocessing system 100 receives two input datasets D1 and D2. The data preprocessing system 100 generates 1005 preliminary samples S11 and S12 from the datasets D1 and D2 respectively.

The transformation execution engine 250 joins the datasets D1 and D2 as specified by the transform T to generate the result set R. The transformation based sampling module 340 determines 1015 the subset S2 of the result set based on the result set R. The transformation based sampling module 340 identifies the input records of the preliminary sample set S11 and the input records of the preliminary sample set S12 processed for obtaining each record of the subset S2 of the result set.

The transformation based sampling module 340 combines the input records of the sample set S11 processed for obtaining records of the subset S2 into a sample set S31. The transformation based sampling module 340 combines the input records of the sample set S12 processed for obtaining records of the subset S2 into a sample set S32. Accordingly, the transformation based sampling module 340 determines sample sets S31 and S32 (corresponding to input datasets D1 and D2 respectively) and adds them to sets of samples corresponding to each input dataset.

FIG. 13 illustrates a process for performing sampling based on features of the transformation result, according to an embodiment of the invention. The data preprocessing system 100 receives 1300 a transform operation and one or more input datasets on which the transform operation needs to be performed. The transformation based sampling module 340 generates 1310 a preliminary sample for each of the input dataset. In an embodiment, the transformation based sampling module 340 estimates a size of the target sample based on the transform. The transformation based sampling module 340 generates 1310 the preliminary sample dataset to be larger than the estimated size of the target transformation based sample. For example, the size of the preliminary sample dataset may be a multiple of the size of the target sample based on the transform.

The transformation based sampling module 340 applies the transform to the records of the preliminary sample datasets to generate 1320 a result set. The user interface manager 310 presents 1330 visualization of the data of the result set, for example, charts describing data distribution of the result set. The user interface manager 310 receives 1340 information identifying subset of the result set based on the visualization of the result set presented to the user (or based on expressions of a scripting language specifying criteria for determining subsets of the result set.)

The transformation based sampling module 340 identifies 1350 the records of the preliminary sample sets processed as inputs to obtain the records of the subset of the result set. The transformation based sampling module 340 combines the identified inputs from each input dataset as a sample based on specific feature or characteristic of the transformation result. The transformation based sampling module 340 saves the determined transformation based samples in the sample store 360.

Alternative Embodiments

It is to be understood that the Figures and descriptions of the present invention have been simplified to illustrate elements that are relevant for a clear understanding of the present invention, while eliminating, for the purpose of clarity, many other elements found in a typical IT management system. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A method for preprocessing data for analysis, the method comprising:
receiving one or more input datasets, each dataset comprising a plurality of records, wherein the input datasets are for analysis by a data analysis system that requires records of the input datasets to conform to one or more formatting rules;
determining a sample dataset from the input dataset for testing a set of transform operations for preprocessing the input datasets for the analysis, wherein the sample dataset is selected based on data distribution features of the transformation results, the preprocessing modifying one or more records that fail to conform to the formatting rules such that the modified records conform to the formatting rules, the determining of the set of transform operations comprising:
identifying one or more transform operations;
applying the identified one or more transform operations to at least a subset of records of the input datasets to generate a result set;
configuring for presentation at a user interface, a visualization of a distribution of data values for a first attribute of the result set, wherein the visualization comprises features indicating, for each of a plurality of value ranges, each value range corresponding to a plurality of values of the first attribute, a number of records of the result set having data values for the first attribute that are within the value range;
receiving, via the user interface, information identifying a subset of the result set based on one or more features of the distribution indicated by the visualization;
identifying input records of the sample dataset processed by the identified transform operations for generating records of the subset of the result set; and
storing the identified input records to update the sample dataset;
adding the one or more transform operations to a transformation script;
sending the sample dataset to a client device for analysis, wherein the client device is configured to present a user interface to a user allowing the user to debug and test the transformation script using the sample dataset to generate a debugged transformation script; and
using the debugged transformation script to preprocess the input datasets for analysis by the data analysis system.

2. The method of claim 1, wherein visualization of distribution of data values of the result set comprises a chart indicating distribution of one or more columns of the result set, each column corresponding to an aggregation of records of the result set having particular data values.

3. The method of claim 1, wherein receiving information identifying a subset of the result set comprises a selection of a subset of values of a column of the result set, wherein the identified subset comprises records of the result set, such that the data value of the column of the record belongs to the subset.

4. The method of claim 1, further comprising:
storing an association between each input record of an input dataset processed by the identified transforms to generate a record of the result set; and
wherein, identifying input records associated each record of the result set is based on the stored association.

5. The method of claim 1, wherein determining the subset of records of the input datasets comprises:
generating a preliminary sample from an input dataset by using one of the sampling strategies including: random sampling, using a set of consecutive rows as a sample, taking a set of rows wherein a consecutive pair of rows in the set of rows is separated by a fixed number of rows.

6. The method of claim 1, wherein the transform operation is a join operation, and the input datasets comprise a first input dataset and a second input dataset, the method further comprising:
receiving a join criteria for performing the join operation on the first input dataset and the second input dataset; and
wherein each record of the result set is obtained by combining at least a first record of the first input dataset and a second record of the second input set, wherein the first record and the second record are determined to match based on the join criteria.

7. The method of claim 1, wherein a transform operation performs one or more of:
replacing occurrences of an input string occurring in a column of a dataset by a transformed string;
filtering records based on a given criteria such that the transform operation outputs input records that satisfy the given criteria;
aggregating a plurality of records in the input to generate an output record; and
generating an output value if an input value of a data field of a dataset satisfies a predetermined criterion.

8. The method of claim 1, wherein the transform operation replaces a single data value stored in a single column of an input dataset into a plurality of data values, each of the plurality of data values for storing in a different column.

9. The method of claim 1, wherein:
the information identifying a subset of the result set comprises at least a first selection indicating data values of a first attribute of the records of the result set, a second selection indicating data values of a second attribute of the records of the result set, and an operator.

10. The method of claim 1, wherein the visualization further comprises one or more indications indicating whether each of the plurality of value ranges corresponds to values conforming to the formatting rules.

11. A method for generating transformation based samples, the method comprising:
receiving one or more input datasets and a transform operation configured to process one or more input values to generate one or more output values;
applying the identified transform operations to at least a subset of records of the input datasets to generate a result set;
configuring for presentation at a user interface, a visualization of a distribution of data values for a first attribute of the result set, wherein the visualization comprises features indicating, for each of a plurality of value ranges each corresponding to a plurality of values of the first attribute, a number of records of the result set having data values for the first attribute that are within the value range;
receiving, via the user interface, information identifying a subset of the result set based on one or more features of the distribution indicated by the visualization;
identifying input records of the input datasets processed by the identified transform operations for generating records of the subset of the result set;
storing the identified input records as a sample dataset; and adding the one or more transform operations to a transformation script; and
sending the sample dataset to a client device for analysis, wherein the client device is configured to present a user interface to a user allowing the user to debug and test the transformation script using the sample dataset to generate a debugged transformation script; and
using the debugged transformation script to preprocess the one or more input datasets for analysis by a data analysis system.

12. The method of claim 11, wherein visualization of distribution of data values of the result set comprises a chart indicating distribution of one or more columns of the result set, each column corresponding to an aggregation of records of the result set having particular data values.

13. The method of claim 11, wherein receiving information identifying a subset of the result set comprises a selection of a subset of values of a column of the result set, wherein the identified subset comprises records of the result set, such that the data value of the column of the record belongs to the subset.

14. The method of claim 11, further comprising:
storing an association between each input record of an input dataset processed by the identified transforms to generate a record of the result set; and
wherein, identifying input records associated each record of the result set is based on the stored association.

15. The method of claim 11, wherein determining the subset of records of the input datasets comprises:
generating a preliminary sample from an input dataset by using one of the sampling strategies including: random sampling, using a set of consecutive rows as a sample, taking a set of rows wherein a consecutive pair of rows in the set of rows is separated by a fixed number of rows.

16. The method of claim 11, wherein the transform operation is a join operation, and the input datasets comprise a first input dataset and a second input dataset, the method further comprising:
receiving a join criteria for performing the join operation on the first input dataset and the second input dataset; and
wherein each record of the result set is obtained by combining at least a first record of the first input dataset and a second record of the second input set, wherein the first record and the second record are determined to match based on the join criteria.

17. The method of claim 11, wherein a transform operation performs one or more of:
replacing occurrences of an input string occurring in a column of a dataset by a transformed string;
filtering records based on a given criteria such that the transform operation outputs input records that satisfy the given criteria;
aggregating a plurality of records in the input to generate an output record; and
generating an output value if an input value of a data field of a dataset satisfies a predetermined criterion.

18. The method of claim 11, wherein the transform operation replaces a single data value stored in a single column of an input dataset into a plurality of data values, each of the plurality of data values for storing in a different column.

19. A computer readable non-transitory storage medium storing instructions for:
receiving one or more input datasets, each dataset comprising a plurality of records, wherein the input datasets are for analysis by a data analysis system that requires records of the input datasets to conform to one or more formatting rules;
determining sample dataset from the input dataset for testing a set of transform operations for preprocessing the input datasets for the analysis, wherein the sample dataset is selected based on data distribution features of the transformation results, the preprocessing modifying one or more records that fail to conform to the formatting rules such that the modified records conform to the formatting rules, the determining of the set of transform operations comprising:
  identifying one or more transform operations;
  applying the identified one or more transform operations to at least a subset of records of the input datasets to generate a result set;
  configuring for presentation at a user interface, a visualization of a distribution of data values for a first attribute of the result set, wherein the visualization comprises features indicating, for each of a plurality of value ranges, each value range corresponding to a plurality of values of the first attribute, a number of records of the result set having data values for the first attribute that are within the value range;
  receiving, via the user interface, information identifying a subset of the result set based on one or more features of the distribution indicated by the visualization;
  identifying input records of the sample dataset processed by the identified transform operations for generating records of the subset of the result set; and
  storing the identified input records to update the sample dataset;
  adding the one or more transform operations to a transformation script;
sending the sample dataset to a client device for analysis, wherein the client device is configured to present a user interface to a user allowing the user to debug and test the transformation script using the sample dataset to generate a debugged transformation script; and
using the debugged transformation script to preprocess the input datasets for analysis by the data analysis system.

20. The computer readable non-transitory storage medium of claim 19, wherein visualization of distribution of data values of the result set comprises a chart indicating distribution of one or more columns of the result set, each column corresponding to an aggregation of records of the result set having particular data values.

21. The computer readable non-transitory storage medium of claim 19, wherein receiving information identifying a subset of the result set comprises a selection of a subset of values of a column of the result set, wherein the identified subset comprises records of the result set, such that the data value of the column of the record belongs to the subset.

22. The computer readable non-transitory storage medium of claim 19, wherein-the instructions further comprise instructions for:
  storing an association between each input record of an input dataset processed by the identified transforms to generate a record of the result set; and
  wherein, identifying input records associated each record of the result set is based on the stored association.

23. The computer readable non-transitory storage medium of claim 19, wherein the determining the subset of records of the input datasets comprises:
  generating a preliminary sample from an input dataset by using one of the sampling strategies including: random sampling, using a set of consecutive rows as a sample, taking a set of rows wherein a consecutive pair of rows in the set of rows is separated by a fixed number of rows.

24. The computer readable non-transitory storage medium of claim 19, wherein the transform operation is a join operation, and the input datasets comprise a first input dataset and a second input dataset, wherein the instructions further comprise instructions for:
  receiving a join criteria for performing the join operation on the first input dataset and the second input dataset; and
  wherein each record of the result set is obtained by combining at least a first record of the first input dataset and a second record of the second input set, wherein the first record and the second record are determined to match based on the join criteria.

25. The computer readable non-transitory storage medium of claim 19, wherein a transform operation comprises instructions to perform one or more of:
  replacing occurrences of an input string occurring in a column of a dataset by a transformed string;
  filtering records based on a given criteria such that the transform operation outputs input records that satisfy the given criteria;
  aggregating a plurality of records in the input to generate an output record;
  generating an output value if an input value of a data field of a dataset satisfies a predetermined criterion; and
  replacing a single data value stored in a single column of an input dataset into a plurality of data values, each of the plurality of data values for storing in a different column.

26. A computer system, comprising:
a computer processor; and
a computer readable non-transitory storage medium storing instructions thereon, the instructions when executed by a processor cause the processor to perform the steps of:
  receiving one or more input datasets, each dataset comprising a plurality of records, wherein the input datasets are for analysis by a data analysis system that requires records of the input datasets to conform to one or more formatting rules;
  determining a sample dataset from the input dataset for testing a set of transform operations for preprocessing the input datasets for the analysis, wherein the sample dataset is selected based on data distribution features of the transformation results, the preprocessing modifying one or more records that fail to conform to the formatting rules such that the modified records conform to the formatting rules, the determining of the set of transform operations comprising:
    identifying one or more transform operations;
    applying the identified one or more transform operations to at least a subset of records of the input datasets to generate a result set;
    configuring for presentation at a user interface, a visualization of a distribution of data values for a first attribute of the result set, wherein the visualization comprises features indicating, for each of a plurality of value ranges, each value range corresponding to a plurality of values of the first attribute, a number of records of the result set having data values for the first attribute that are within the value range;
    receiving, via the user interface, information identifying a subset of the result set based on one or more features of the distribution indicated by the visualization;

identifying input records of the sample dataset processed by the identified transform operations for generating records of the subset of the result set; and storing the identified input records to update the sample dataset;

adding the one or more transform operations to a transformation script;

sending the sample dataset to a client device for analysis by the data analysis system, wherein the data analysis system client device is configured to present a user interface to a user allowing the user to debug and test the transformation script using the sample dataset to generate a debugged transformation script; and using the debugged transformation script to preprocess the one or more input datasets for analysis by a data analysis system.

\* \* \* \* \*